US011715300B1

(12) United States Patent
Guo et al.

(10) Patent No.: US 11,715,300 B1
(45) Date of Patent: Aug. 1, 2023

(54) SYSTEMS AND METHODS FOR PROVIDING PRODUCT ASSEMBLY STEP RECOGNITION USING AUGMENTED REALITY

(71) Applicant: Robert Bosch GmbH, Stuttgart (DE)

(72) Inventors: Yuliang Guo, Palo Alto, CA (US); Xinyu Huang, San Jose, CA (US); Liu Ren, Saratoga, CA (US)

(73) Assignee: Robert Bosch GMBH, Stuttgart (DE)

(*) Notice: Subject to any disclaimer, the term of this patent is extended or adjusted under 35 U.S.C. 154(b) by 48 days.

(21) Appl. No.: 17/587,505

(22) Filed: Jan. 28, 2022

(51) Int. Cl.
*G06V 20/20* (2022.01)
*G06T 11/00* (2006.01)
*G06T 7/73* (2017.01)
*G06F 18/22* (2023.01)
*G06T 7/00* (2017.01)
*G06V 10/44* (2022.01)

(52) U.S. Cl.
CPC ............ *G06V 20/20* (2022.01); *G06F 18/22* (2023.01); *G06T 7/0004* (2013.01); *G06T 7/73* (2017.01); *G06T 11/00* (2013.01); *G06V 10/443* (2022.01); *G06T 2207/30108* (2013.01)

(58) Field of Classification Search
CPC ...... G06V 20/20; G06V 10/443; G06F 18/22; G06T 7/0004; G06T 7/73; G06T 11/00; G06T 2207/30108
See application file for complete search history.

(56) References Cited

U.S. PATENT DOCUMENTS

| 2018/0180085 | A1* | 6/2018 | Watanabe | G05B 19/41805 |
| 2018/0259946 | A1* | 9/2018 | Kadokura | G05B 19/41875 |
| 2019/0123931 | A1* | 4/2019 | Schuster | G05B 13/0265 |
| 2020/0273177 | A1* | 8/2020 | Chen | G06V 20/653 |
| 2022/0035966 | A1* | 2/2022 | McMinn | G06N 20/00 |
| 2022/0101105 | A1* | 3/2022 | Mezghanni | G06F 30/27 |

OTHER PUBLICATIONS

Abdallah, et al., Automatic Inspection of Aeronautical Mechanical Assemblies by Matching the 3D CAD Model and Real 2D Images, Journal of Imaging, 2019.
Redmon, et al., YOLO9000: Better, Faster, Stronger, IEEE Conference on Computer Vision and Pattern Recognition, 2017.
Xie, et al., Holistically-Nested Edge Detection, Proceedings of IEEE International Conference on Computer Vision, 2015.
Trinh, et al., Skeleton Search: Category-Specific Object Recognition and Segmentation Using a Skeletal Shape Model, Proceedings of IEEE International Journal of Computer Vision, 2011.

* cited by examiner

*Primary Examiner* — Jitesh Patel
(74) *Attorney, Agent, or Firm* — Dickinson Wright PLLC (57) ABSTRACT

A method and system for an augmented reality assistant that recognizes a step in a product assembly process and assists in the installation of a constituent component into a base component. That system having a prepopulated database of templates, the templates being generated based off of two-dimensional images and the related three-dimensional models. The template database is used to train a first machine learning model, that model configured to identify the step in the product assembly process based on an image captured from an image capture device. Verifying that determination by a second machine learning model. Presenting an AR assistant to the user to assist with that step based on the related template.

20 Claims, 7 Drawing Sheets

OVERHEAD CAPTURE DEVICE IMAGE OF BASE COMPONENT

FIG. 3A

OVERHEAD CAPTURE DEVICE IMAGE OF BASE COMPONENT OVERLAID WITH CONSTITUENT COMPONENT

SYSTEMS AND METHODS FOR PROVIDING PRODUCT ASSEMBLY STEP RECOGNITION USING AUGMENTED REALITY

TECHNICAL FIELD

The present disclosure relates to product assembly, and in particular to systems and methods for providing augmented-reality assistance to a product assembly process.

BACKGROUND

Increasingly, product assembly processes include or rely on automation to perform various steps of a given product assembly or other product assembly processes. While automation has become ubiquitous in manufacturing, there remain various functions or steps that rely on human intervention. As such, manufacturers continue to seek greater efficiency in manufacturing outcomes by minimizing product assembly deviation (e.g., reducing or eliminating human error introduced by the human component of the process).

Typically, mitigating such human error includes manual inspection, oversight, and/or correction. This may be time-consuming and may greatly increase the operating costs of a product assembly line. Alternatively, human error mitigation may include the use of specially designed product assembly guides or jigs. Such guides and jigs may further add operating costs to the product assembly and may require periodic manual inspection and/or maintenance.

SUMMARY

This system provides a step recognition process that further provides an augmented reality assistant for that step.

Another aspect of the disclosed embodiments includes a method for recognizing the step in an assembly process. The method includes receiving, from an image capture device, image data including at least one image corresponding to a step in a product assembly process; generating, using a first machine learning model trained using an augmented dataset generated based on at least one two-dimensional image and at least one corresponding three-dimensional digital model, one or more feature vectors based on the at least one image; identifying a feature vector template of a plurality of feature vector templates based on the one or more feature vectors; identifying at least one base component and at least one constituent component based on the feature vector template; determining a current step in the product assembly process based on the identification of the at least one base component, the at least one constituent component, and the feature vector template; generating a position indicator based on the identification of the at least one base component, the at least one constituent component, and the feature vector template in the product assembly process; generating, for display, an output that includes, at least, the at least one base component, the at least one constituent component, and position indicator; and receiving subsequent image data and adjusting a visual aspect of the position indicator based on the subsequent image data.

Another aspect of the disclosed embodiments includes a system for determining a step in a product assembly process. The system includes a processor and memory. The memory includes instructions that, when executed by the processor, cause the processor to receive, from an image capture device, image data including at least one image corresponding to a step in a product assembly process; generate, using a first machine learning model trained using an augmented dataset generated based on at least one two-dimensional image and at least one corresponding three-dimensional digital model, one or more feature vectors based on the at least one image; identify a feature vector template of a plurality of feature vector templates based on the one or more feature vectors; identify at least one base component and at least one constituent component based on the feature vector template; determine a current step in the product assembly process based on the identification of the at least one base component, the at least one constituent component, and the feature vector template; generate a position indicator based on the identification of the at least one base component, the at least one constituent component, and the feature vector template in the product assembly process; generate, for display, an output that includes, at least, the at least one base component, the at least one constituent component, and position indicator; and receive subsequent image data and adjusting a visual aspect of the position indicator based on the subsequent image data.

Another aspect of the disclosed embodiments includes an apparatus for determining a step in a product assembly process. The apparatus includes a processor and memory. The memory includes instructions that, when executed by the processor, cause the processor to receive, from an image capture device, image data including at least one image corresponding to a step in a product assembly process; generate, using a first machine learning model trained using an augmented dataset generated based on at least one two-dimensional image and at least one corresponding three-dimensional digital model, one or more feature vectors based on the at least one image; identify a feature vector template of a plurality of feature vector templates based on the one or more feature vectors; identify at least one base component and at least one constituent component based on the feature vector template; determine a current step in the product assembly process based on the identification of the at least one base component, the at least one constituent component, and the feature vector template; generate a position indicator based on the identification of the at least one base component, the at least one constituent component, and the feature vector template in the product assembly process; generate, for display, an output that includes, at least, the at least one base component, the at least one constituent component, and position indicator; and receive subsequent image data and adjusting a visual aspect of the position indicator based on the subsequent image data.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Embodiments of the present disclosure are described herein. It is to be understood, however, that the disclosed embodiments are merely examples, and other embodiments may take various and alternative forms. The figures are not necessarily to scale; some features could be exaggerated or minimized to show details of particular components. Therefore, specific structural and functional details disclosed herein are not to be interpreted as limiting but merely as a representative basis for teaching one skilled in the art to variously employ the embodiments. As those of ordinary skill in the art will understand, various features illustrated and described with reference to any one of the figures may be combined with features illustrated in one or more other figures to generate embodiments that are not explicitly illustrated or described. The combinations of features illustrated provide representative embodiments for typical applications. Various combinations and modifications of the features consistent with the teachings of this disclosure, however, could be desired for particular applications or implementations.

As described, product assembly processes, such as those associated with appliance assembly (e.g., such as door assembly for washing machines, dishwashers, microwave ovens, conventional ovens, and the like or other suitable appliance assemblies) and/or other suitable product assemblies, include or rely on automation to perform various steps of a given product assembly or other product assembly processes.

While automation has become ubiquitous in manufacturing, there remain various functions or steps that rely on human intervention. For example, an assembly line worker may, during a step in the assembly of an appliance door, misalign one or more components of the door assembly, which may not be readily discernable by human inspection. Such misalignment may be problematic to downstream steps in the product assembly process or may manifest as a failure in production (e.g., resulting in warranty claims and/or customer dissatisfaction). As such, manufacturers continue to seek greater efficiency in manufacturing outcomes by minimizing product assembly deviation (e.g., reducing or eliminating human error introduced by the human component of the process).

Typically, mitigating such human error includes manual inspection, oversight, and/or correction. This may be time-consuming and may greatly increase the operating costs of a product assembly line. Alternatively, human error mitigation may include the use of specially designed product assembly guides or jigs. Such guides and jigs may further add operating costs to the product assembly and may require periodic manual inspection and/or maintenance. In addition, such mitigation strategies may inject other potential sources of error into the product assembly process (e.g., such as incorrect use of a jig or template, improper inspection, and the like).

An augmented reality assisted pipeline for door assembly of a washing machine is expected to automatically recognize the step a worker is currently working on and provide AR guidance accordingly. The AR guidance may indicate whether the current assembly step is performed correctly (e.g., within an acceptable threshold or tolerance) and where the next part or component is to be arranged. In order for a product assembly process to provide the guidance reliably, highly robust visual recognition of assembly steps and part-level verification may be required.

Deep learning methods of object detection have been applied in natural scenes. However, the limitation of training data makes them relatively inapplicable to a process for step detection in a manufacturing assembly process. Typically, such techniques require a relatively large amount of human-annotated, real images to train a model (e.g., typically more than 10,000 real images). However typical industrial applications may have very limited annotated real images or image data (e.g., hundreds, rather than thousands or tens of thousands of images). Additionally, the subject of such images associated with an industrial scenario are usually overly specific and detailed, such that pre-trained object detection models (e.g., trained using general nature images) may not be applicable. However, because industrial objects usually have computer-aided design models associated with them, which may be utilized for machine learning model training, a unique challenge is how to effectively utilize the computer-aided design models corresponding to various training images.

Typical techniques for machine learning model training rely on classic image edge detectors (e.g., Canny or other suitable image edge detectors), to detect image edges and match them to the computer-aided design model corresponding to the image. The ratio of matched edges indicates the correctness of the installation of each machine part.

However, such techniques have several limitations. First, a classic edge detector is relatively sensitive to lighting change and texture variation, which are common scenarios in product assembly. Second, such techniques typically verify the correctness of each part only, which does not lead to an overall step recognition result (e.g., which may include different configurations of parts and heavy occlusions). Finally, such techniques require a tedious tuning process of system parameters that limit or prevent efficient adaptation to tasks involving new machines.

Accordingly, systems and methods, such as those described herein, configured to provide automated step recognition and error mitigation for a product assembly process, may be desirable. In some embodiments, the systems and methods described herein may be configured to visually recognize assembly steps and verify the proper installation of each component of a door assembly.

The systems and methods described herein may be configured to use an AR assistant for door assembly (e.g., washing machine, or other similar appliances, vehicles, or other products having doors). The systems and methods described herein may be configured to use an image captured during a door assembly (e.g., on a production line) of a door for a washing machine. The systems and methods described herein may be configured to identify a step of a product assembly process (e.g., using computer vision techniques and/or image processing techniques). The systems and methods described herein may be configured to identify the current assembly step and verify that determination by determining whether a respective component of the assembly step is installed according to an expected installation position. The systems and methods described herein may be configured to combine the advantages of deep learning and classic shape matching techniques to conquer the challenge of limited training data and achieve highly robust step recognition results.

The systems and methods described herein may be configured to provide machine learning model training and machine learning model testing. The systems and methods described herein may be configured to perform machine learning model training to teach a machine learning model embedding space to identify, using image data input, a step in the product assembly process. The systems and methods described herein may be configured to perform machine learning model testing that includes identifying the step of the product assembly process and verifying the identified step (e.g., determining whether the identified step corresponds to an expected step). The systems and methods described herein may be configured to improve the performance of the machine learning model, using the verification of the identified step as further training information for the machine learning model.

In some embodiments, the systems and methods described herein may be configured to, during the performance of the machine learning model training, apply a metric learning technique to train the machine learning model to learn an embedding space, such that images associated with the same steps appear close to each other and images associated with different steps appear far from each other. The systems and methods described herein may be configured to, using the training, generate a template feature bank which may be used in the testing phase. The systems and methods described herein may be configured to include a unique data augmentation procedure that uses at least one template real image and corresponding aligned computer-aided design models to synthesis unobserved configurations of parts. For example, the template real image may include an overhead view of a previously captured instance of a step in a product assembly process and the computer-aided design model may indicate recording the three-dimensional measurements of the components involved in the manufacturing step.

The systems and methods described herein may be configured to encode the input image into a feature vector in an embedding space. The closest template feature vector in the processor determines the current step previously saved feature bank determines the current step. The systems and methods described herein may be configured to further verify each expected part associated with the predicted step based on a hybrid process using deep learning-based edge detection, holistically-nested edge detection, and classic shape matching, the oriented Chamfer matching introduced in. If any expected parts do not appear at the expected location, the predicted step is considered invalid.

The systems and methods described herein may be configured to differ from a general deep-learning framework, which relies upon tens of thousands of annotated real images for the training, the systems and methods described herein may be configured to rely on relatively limited real image data, (e.g., one template image per step, and additionally available computer-aided design models for the training).

The systems and methods described herein may be configured to combine the advantages of deep learning and classic shape matching. The systems and methods described herein may be configured to use the deep-learning for the initial step recognition to rule out the highly unlikely configurations of parts. The systems and methods described herein may be configured to use a hybrid process in part verification including deep-learning edge detector and classic shape matching such that the verification accuracy is more robust to illumination change and texture variation.

In some embodiments, the systems and methods described herein may be configured to use one or more template real images and the associated projected masks of computer-aided design models to synthesize unobserved configurations of door parts. As described herein, when a computer-aided design mask is overlaid on a template image, the image region covered by the mask may be cropped out and placed at another random location on the template image from the previous assembly step. The synthetic images with slight displacements of parts may be treated as valid samples in the training. The synthetic images with huge displacements of parts may be treated as invalid samples. Meanwhile, standard illumination and color augmentation are also included to make the trained model generalizable to new illumination and texture situations.

In some embodiments, the systems and methods described herein may be configured to enable the generation of countless training examples from very limited template images. The synthesized training data includes valid samples with acceptable tolerances for misplacement of parts and invalid samples with huge misplacement of parts or unexpected configurations.

In some embodiments, the systems and methods described herein may comprise a hybrid process combining a deep-learning-based edge detector, (e.g., holistically-nested edge detection), and a classic edge-based template matching process. The holistically-nested edge detector is more robust compared to classic Canny detection in regards to identifying texture boundaries and illumination.

In some embodiments, the systems and methods described herein may be configured to convert each computer-aided design model into an individual edge map and transform it into an oriented Chamfer distance map for an efficient query. The Chamfer distance maps associated with computer-aided design models may be treated as the templates facilitating the later matching process. As described herein, a query image may be converted into an oriented edge map, by the processor, via conducting holistically-nested edge detection followed by edge-based non-maximum suppression and edge orientation computation. The extracted oriented edges efficiently vote for each part template by querying the values saved at the $(x, y, \theta)$ locations of the edge in the previously prepared Chamfer distance maps. The parts that got edge supports over a certain ratio (e.g., greater than 60% or other suitable percentage, value, absolute value, integer and the like) are considered as "correct" otherwise "incorrect".

In some embodiments, the systems and methods described herein may comprise machine learning models which require far fewer training documents, computing resources, and time in order to train the machine learning models. This is achieved by training the documents with two-dimensional images and corresponding three-dimensional models; these images may be related to steps in product assembly process. This decreased effort required for training results in the systems and methods described herein being more adept at adding new steps to the process as well as identifying components in altering lighting conditions.

Unlike general deep learning (DL) frameworks which rely on thousands of annotated real images for training, the present disclosure describes systems and methods that require very limited real image data and the respective computer-aided design models of the objects captured in the image. The systems and methods described herein may be configured to provide robust and accurate results under illumination changes and texture variations of installed parts. The systems and methods described herein are quick to adapt to new components parts and new assembly steps.

From the perspective of the human worker, the systems and methods described herein may be configured to start with a base component arriving at the station of the worker. The processor identifies the component and determines which step of the process is related to the base component. Based on the identified step, the processor further determines where a constituent component must be placed to complete the step. A display is instructed to display to the worker the captured image overlaid with an indication of where the constituent component must be placed. The processor awaits the attempt by the worker and determines based on a comparison of the updated image data and the current template whether the step was completed successfully. If so, the display would be instructed to indicate success. Otherwise, the display is instructed to indicate a failure and wait for the worker to correct it. The process repeats until it is confirmed that the worker correctly aligned the constituent part with the base component.

In some embodiments, the systems and methods described herein may be configured to include receiving image data including at least one image corresponding to at least one base component of a product assembly from an image capture device; generating, using a first machine learning model trained using an augmented dataset generated based on at least one two-dimensional image and at least one corresponding three-dimensional digital model, one or more feature vectors based on the at least one image; identifying a feature vector template of a plurality of feature vector templates based on the one or more feature vectors; generating an initial prediction based on the identified feature vector template; generating, using a second machine learning model, at least one edge map based on the at least one image; generating a similarity score by comparing the edge map with the identified feature vector template; and in response to a determination that the similarity value is greater than or equal to a threshold, determining that initial prediction is valid.

In some embodiments, the systems and methods described herein may further include displaying the received image data, from the image capture device, overlaid with a position indicator for a constituent component, based on the template.

In some embodiments, the systems and methods described herein may further include responding to a change in the image data being captured by the image capture device that results in movement of the constituent component, by determining a percent of matching edges between the real-time image data of the constituent component and the associated position as indicated by the template.

In some embodiments, the systems and methods described herein may further include outputting an indication of success when the percent is above the threshold and an indication of failure when the percent of matching edges is not.

In some embodiments, the systems and methods described herein may further comprises the position indicator indicates success by altering the color of the overlay.

In some embodiments, the systems and methods described herein may further include the base component being a door and the constituent component is to be installed onto the base component.

In some embodiments, the systems and methods described herein may further include comparing the similarity score to a second threshold that is higher than a first threshold, in response to surpassing the second threshold, store image data in the training dataset corresponding to the identified template.

In some embodiments, the systems and methods described herein may further include the templates sharing a uniform orientation and further comprises color and texture data of the image.

In some embodiments, the systems and methods described herein may further include the augmented dataset being generated by: receiving a training dataset that includes at least one two-dimensional image and at least one corresponding three-dimensional model, the training dataset being associated with a base component, and at least one constituent component; and generating a feature vector template related to a step in a process by augmenting the two-dimensional image with visual and spatial relationship data from the associated three-dimensional model.

In some embodiments, the systems and methods described herein may be configured to, when executed by the processor, cause the processor to receive, from an image capture device, image data including at least one image corresponding to a step in a product assembly process. The systems and methods described herein may be configured to generate, using a first machine learning model trained using an augmented dataset generated based on at least one two-dimensional image and at least one corresponding three-dimensional digital model, one or more feature vectors based on the at least one image. In some embodiments, the systems and methods described herein may be configured to identify a feature vector template of a plurality of feature vector templates based on the one or more feature vectors. In some embodiments, the systems and methods described herein may be configured to identify at least one base component and at least one constituent component based on the feature vector template. In some embodiments the systems and methods described herein may be configured to determine a current step in the product assembly process based on the identification of the at least one base component, the at least one constituent component, and the feature vector template. In some embodiments the systems and methods described herein may be configured to generate a position indicator based on the identification of the at least one base component, the at least one constituent component, and the feature vector template in the product assembly process. In some embodiments the systems and methods described herein may be configured to generate, for display, an output that includes, at least, the at least one base component, the at least one constituent component, and position indicator; and receive subsequent image data and adjusting a visual aspect of the position indicator based on the subsequent image data.

The systems and methods described herein may be configured to, in response to a change in the image data, corresponding to movement of the constituent component, determining a percentage of matching edges between the image data of the constituent component and the position indicated by the feature vector template.

The systems and methods described herein may be configured to output an indication of success in response to the percentage of matching edges being greater than a threshold and outputting an indication of failure in response to the percentage of matching edges being less than the threshold.

The systems and methods described herein may be configured to display the position indicator corresponding to the position of the at least one constituent component in relation to the at least one base component, as indicated by the feature vector template.

The systems and methods described herein may display an indication of success by altering a visual aspect of the position indicator.

The systems and methods described herein may include the base component being a door and the constituent component being configured to mate with the base component.

The systems and methods described herein may be configured the feature vector template having an orientation corresponding to orientations of the plurality of feature vector templates, and wherein the identified feature vector template includes visual aspect data of the at least one image.

The systems and methods described herein may be configured to include identifying the feature vector template of a plurality of feature vector templates based on the one or more feature vectors generating an initial prediction template; generating, by a second machine learning model, an edge map based on the image data; generating a similarity value by comparing the edge map with the initial prediction template; and determining the initial prediction template is valid in response to a determination that the similarity value is greater than or equal to a threshold.

The systems and methods described herein may be configured to include the plurality of feature vector templates being generated by: receiving a training dataset that includes at least one two-dimensional image, at least one corresponding three-dimensional model, and an associated step in a product assembly process, the training dataset being associated with at least one base component, at least one constituent component and a spatial relationship between them; and generating one of the feature vector templates related to a step in a process by augmenting the two-dimensional image with visual and spatial relationship data from the three-dimensional model associated with the same step in the product assembly process.

Figure 1:
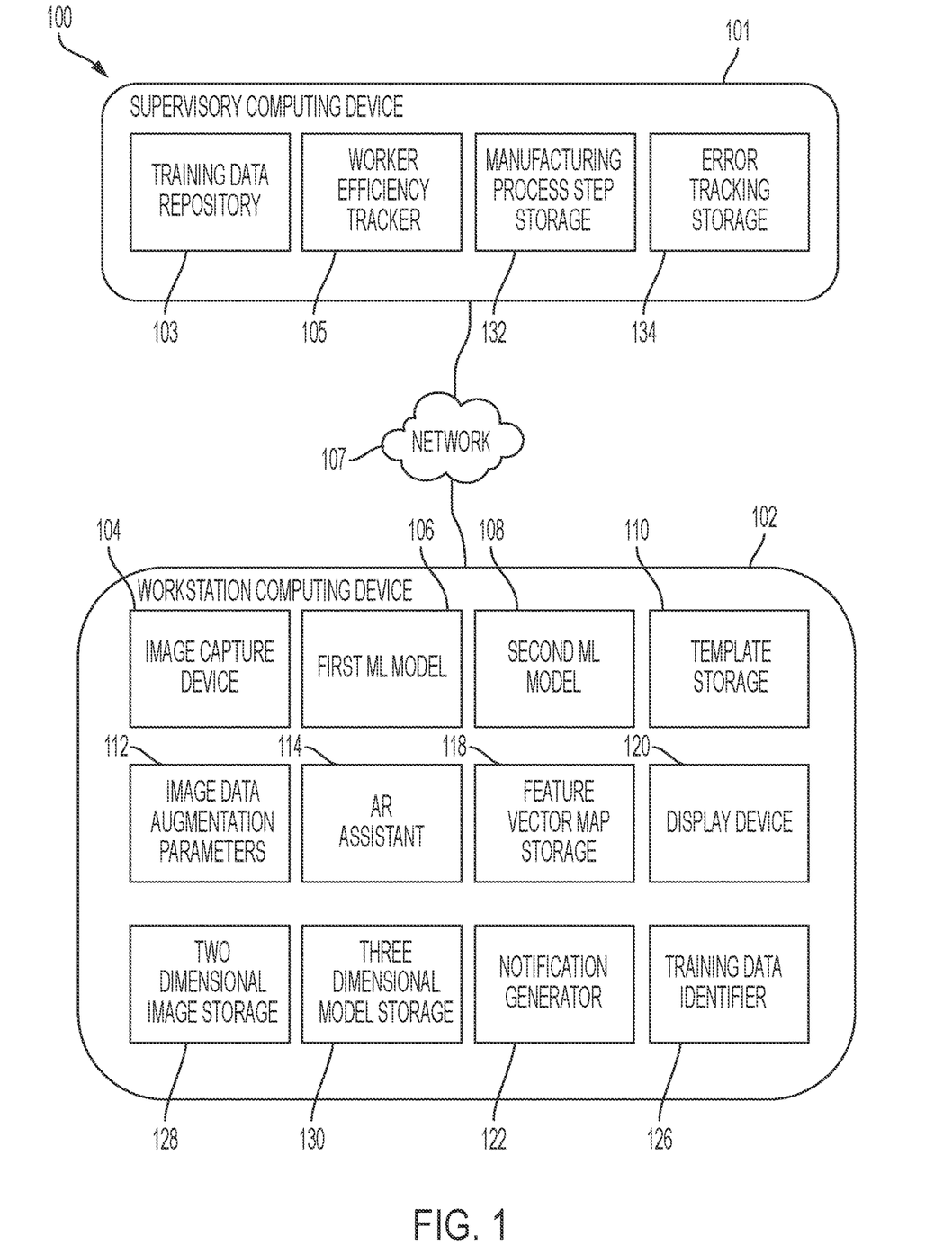
FIG. 1 generally illustrates product assembly computing system according to the principles of the present disclosure.

FIG. 1 generally illustrates a computing environment 100. For example, a computing environment 100 may include a computing device 102. The computing device 102 may include any suitable computing device and may be associated with a workstation of a product assembly line. The computing device 102 may be in communication with a supervisory computing device 101 (e.g., via the network 107 using a wired or wireless communications protocol). An image capture device 104 may be situated above the position where the human worker performs various steps in the assembly process. The image capture device 104 may be capable of capturing real-time video as well as still images. The image capturing device 104 may include any suitable image capturing device such as a camera (e.g., a digital camera or other suitable camera) or other suitable image capturing device. The overhead positioning of the image capture device 104 provides a uniform orientation of the captured images. That orientation is shared with all the test datasets and templates.

In some embodiments, the computing device 102 may use one or more machine learning models, such as a first machine learning model 106 and a second machine learning model 108. For example, the first machine learning model 106 may include a deep neural network or other suitable machine learning model (e.g., such as holistically-nested edge detection and the like) capable of learning structured edge maps that are configured to determine the edge/object boundary of objects in images. The first machine learning model 106 may be trained using the training dataset, two-dimensional images, and the three-dimensional models that correspond to the processing step of the two-dimensional image. The edge maps (e.g., which may include chamfer edge maps and the like) created by the augmented data (e.g., templates) may include feature vectors stored as (X, Y, θ) for each pixel of the augmented template. The computing device 102 may use the templates to compute a similarity score (e.g., such as by comparing pixels, pixel by pixel, in a respective template with a respective image).

In some embodiments, the second machine learning model 108 may use canny edge detection or any suitable edge detection approach to generate an edge map based on the image data captured from the image capture device 104. The computing device 102 may use the edge map to determine the shapes of the objects in the captured image data. The computing device 102 may use the edge map to perform the predicted step of the product assembly process.

The computing device 102 may generate, using the image data augmentation parameters 112, templates by augmenting the two-dimensional images in the training dataset with one or more corresponding three-dimensional models. The computing device 102 may store the templates in the template storage 110. The image data augmentation parameters 112 may indicate information for overlaying at least one two-dimensional image associated with a step in the product assembly process over the corresponding three-dimensional model. The computing device 102 may store the templates in template storage 110, with other templates generated by the computing device 102 or received from any suitable source. Three-dimensional models may be in any known format appropriate for three-dimensional models such as computer-aided design and the like. Computer-aided design files are understood as comprising all file formats designed with the aid of a computing device, such as the computing device 102 or other suitable computing devices.

The computing environment 100 includes at least one machine learning model that is configured to predict a step in a product assembly process by identifying a template, generated based on the training dataset and augmented using the image data augmentation parameters 112, using an image received from an image capture device 104. Each template may be associated with a step in the product assembly process. The templates are stored in the template storage 110.

The computing device 102 stores, using the feature vector map storage 118, templates generated based on a combination of the data from at least one two-dimensional image and at least one three-dimensional model related to a step in a product assembly process. Computing device 102 may further generate additional training data sets conversions of input images for processing by the first machine learning model 106 and store them in the feature vector map storage 118. Feature vector maps are accurate by greater than a threshold (e.g., greater than or equal to 60% or other suitable percentage, value, absolute value, integer and the like) are stored with their corresponding input images as training data sets corresponding to the step they illustrate by the training dataset identifier. If the resulting similarity score is less than the predetermined threshold, the vector maps and their corresponding input images are discarded.

The display device 120 may include any means of displaying a user interface to a worker in a manufacturing environment. Such a display includes but is not limited to, light-emitting diode (LED), organic light-emitting diode (OLED), liquid crystal display LCD, thin-film transistor (TFT), active-matrix organic light-emitting diodes (AMO-LED), plasma display panel (PDP), quantum dot light-emitting diode (QLED), cathode ray tube displays, any other suitable display, or a combination thereof.

The computing device 102 may use the display device 120 to display the images received from the image capture device 104 as well as any visual notifications generated using notification generator 122. The computing device 102 may use the AR assistant to generate a visual indication of the correct placement of at least one constituent component. The computing device 102 may notify the user, using the notification generator 122, of the correct placement by overlaying the correct placement indicator onto the visual data captured by the image capture device 104. The computing device 102 may further use the notification generator 122 to dynamically update the visual notification to the user to indicate based on changes to the image data received from the image capture device 102. Further non-visual notification may be generated by the computing device 102 which includes, but is not limited to an audible notification, a tactile notification, or any appropriate form of notification or combination thereof.

The computing device 102, using the augmented Reality assistant 114, generates at least a visual notification to the user (e.g., an assembly worker) indicating the status of the placement of the constituent components. The determination of the desired spatial relationship between at least one constituent component and a base component may be based on the template. For example, in a step of a product assembly process to assemble a door for an appliance, the frame of the door is a base component, and components such as handles, insulation sheets, and any other components, to be mated with the door, are constituent components. Mating the constituent component to the base components may include installing, coupling, integrating, pairing, blending, combining, merging, mixing, linking, attaching, affixing, any other appropriate act, or a combination thereof.

The computing device 102, using the display device 120 as illustrated in FIG. 1, generally illustrates the current image may be captured by the image capture device 104. The AR assistant 114 uses information from the template to project a shape onto the image that indicates the desired location of the constituent component. The color of that shape further indicates whether the component is installed correctly, incorrectly, or if the processor is awaiting action from the worker. Changes to the display may be notified to the user by the notification generator 122. Notifications may be visual, auditory, tactile, or any similar output.

The computing device 102, using the two-dimensional image storage 128 and/or the three-dimensional model storage 130, may store the training data sets. Each training image is associated with a step in the product assembly process. The images may illustrate the step in the product assembly process from a fixed orientation. New images added to the training data set have an orientation adjusted to match that of the universal orientation.

The supervisory computing device 101 has at least a processor to perform any of the functions of the systems and methods described herein. The supervisory computing device 101 comprising the manufacturing step storage 132 stores all the steps in the product assembly process. The supervisory computing device 101 uses the error storage tracking 134 to store all reported errors generated through the use of the systems and methods described herein. The training data repository 103 includes all the raw image files related to steps in the product assembly process. Further included is a worker efficiency tracker 105 that is used by the supervisory computing device 101 to track and update worker efficiency metrics related to efficiency and quality of work.

The functionality described is not restricted to operating on either the supervisory computing device 101 or the computing device 102. All functionality may be attributed to either device or split among them in any available permutation or among an interconnected network of computing devices.

Figure 2:
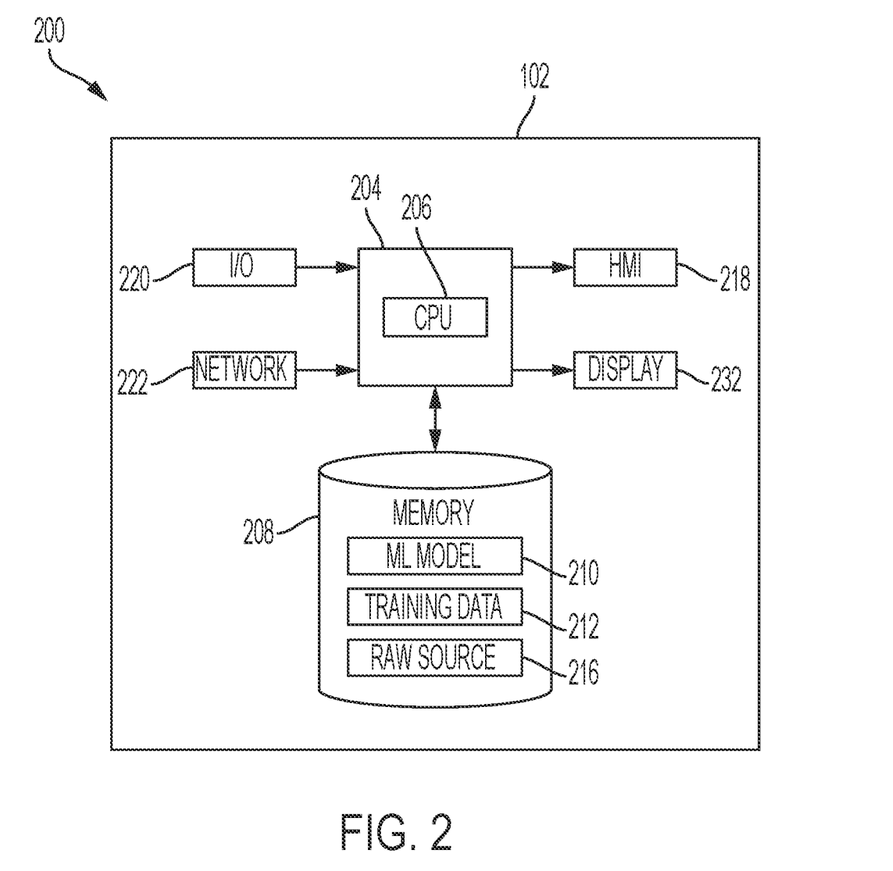
FIG. 2 generally illustrates a computing device according to the principles of the present disclosure.

FIG. 2 generally illustrates a system 200, which may be configured to annotate data. The system 200 may include at least one computing device 102. The computing device 102 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction set such as one of the x86, ARM, Power, or MIPS instruction set families.

The CPU 206 may execute stored program instructions that are retrieved from the memory unit 208. The stored program instructions may include software that controls the operation of the CPU 206 to perform the operation described herein. In some embodiments, the processor 204 may be a system on a chip (SoC) that integrates the functionality of the CPU 206, the memory unit 208, a network interface, and input/output interfaces into a single integrated device. The computing device 102 may implement an operating system for managing various aspects of the operation.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing device 102 is deactivated or loses electrical power. The volatile memory may include static and dynamic random-access memory (RAM) that stores program instructions and data. For example, the memory unit 208 may store a machine-learning algorithm 210, a training dataset 212 for the machine-learning algorithm 210, raw source dataset 216.

The computing device 102 may include a network interface device 222 that is configured to provide communication with external systems and devices. For example, the network interface device 222 may include a wired and/or wireless Ethernet interface as defined by the Institute of Electrical and Electronics Engineers (IEEE) 802.11 family of standards. The network interface device 222 may include a cellular communication interface for communicating with a cellular network (e.g., 3G, 4G, 5G, and the like). The network interface device 222 may be further configured to provide a communication interface to an external network.

The computing device 102 may include an input/output (I/O) interface 220 that may be configured to provide digital and/or analog inputs and outputs. The I/O interface 220 may include additional serial interfaces for communicating with external devices (e.g., Universal Serial Bus (USB) interface).

The computing device 102 may include a human-machine interface (HMI) device 218 that may include any device that enables the system 200 to receive control input. Examples of input devices may include human interface inputs such as keyboards, mice, touchscreens, voice input devices, and other similar devices. The computing device 102 may include a display device 232. The computing device 102 may include hardware and software for outputting graphics and text information to the display device 232. The display device 232 may include an electronic display screen, projector, printer or other suitable devices for displaying information to a user or operator. The computing device 102 may be further configured to allow interaction with remote HMI and remote display devices via the network interface device 222.

The system 200 may be implemented using one or multiple computing networks. While the example generally illustrates a single computing device 102 that implements all of the described features, it is intended that various features and functions may be separated and implemented by multiple computing units in communication with one another. The particular network architecture selected may depend on a variety of factors.

The system 200 may implement a machine-learning algorithm 210 that is configured to analyze the raw source dataset 216. The raw source dataset 216 may include raw or unprocessed sensor data that may be representative of an input dataset for a machine-learning model. The raw source dataset 216 may include video, video segments, images, text-based information, and raw or partially processed sensor data (e.g., radar map of objects). In some embodiments, the machine-learning algorithm 210 may be a neural network algorithm that is designed to perform a predetermined function. For example, the neural network algorithm may be configured in automotive applications to identify pedestrians in video images.

The system 200 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include source videos with and without pedestrians and corresponding presence and location information. The source videos may include various scenarios in which pedestrians are identified.

The machine-learning algorithm 210 may be operated in a learning model using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 may compare output results (e.g., annotations) with the results included in the training dataset 212. Since the training dataset 212 includes the expected results, the machine-learning algorithm 210 may determine when performance is acceptable. After the machine-learning algorithm 210 achieves a predetermined performance level (e.g., 100% or other suitable percentage, value, absolute value, integer and the like agreement with the outcomes associated with the training dataset 212), the machine-learning algorithm 210 may be executed using data that is not in the training dataset 212. The trained machine-learning algorithm 210 may be applied to new datasets to generate annotated data.

Figure 3A:
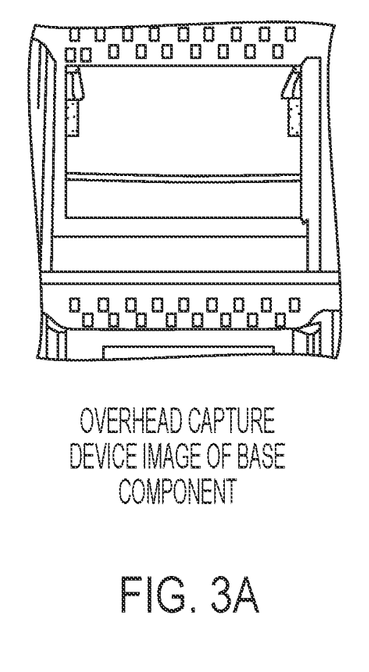
FIGS. 3A and 3B generally illustrate product assembly interfaces according to the principles of the present disclosure.
Figure 3B:
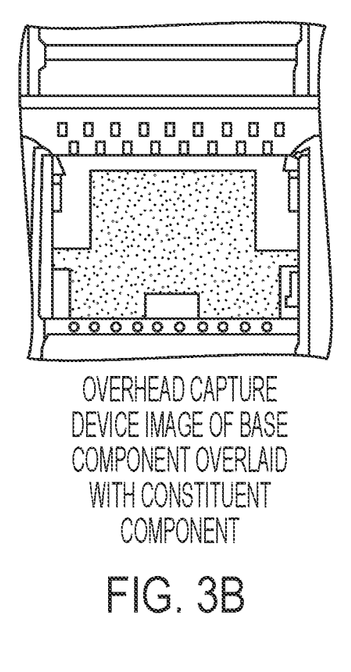

FIG. 3A illustrates an image captured by the image capture device from an overhead perspective relative to the position of the worker. The image in FIG. 3A is of a washing machine door that is yet to be assembled from the overhead perspective of the worker's station. It should be understood that, while an example of a washing machine door is described herein, the principles of the present disclosure may be applied to any suitable part assembly including, in addition to, or instead of those described herein. FIG. 3B illustrates a subsequent display of the washing machine door with an overlay indicating the correct position for a constituent component to be installed, based on the template related to this step in the product assembly process, as instructed by AR assistant 114. Here, the component in FIG. 3A is the base component and the part to be installed is the constituent component. The spatial relationship is determined first by identifying the edges of the washing machine door, matching the edge map of the live image with the template related to this step. When the template and the live image are aligned, spatial data in the template indicate the correct position of the part to be installed in relation to the edges of the washing machine door. That spatial data is used to display an indication to the worker regarding the installation of the constituent component. The color of the indication may change to indicate correct placement, incorrect placement, or awaiting placement.

Figure 4:
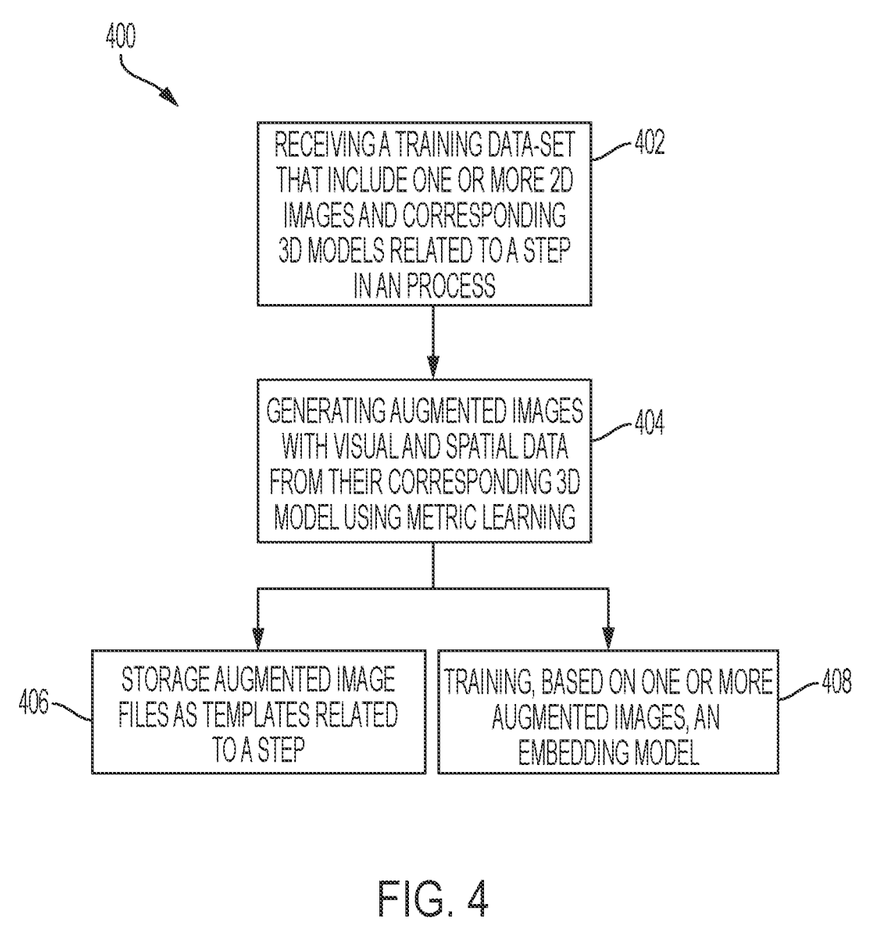
FIG. 4 is a flow chart generally illustrating a machine learning model training method according to the principles of the present disclosure.

FIG. 4 is a block diagram illustrating a high-level overview of the training method 400 for the first machine learning model 106 to recognize a step in a product assembly process. At 402, the training method 400 receives the training dataset, the dataset having collections of two-dimensional images and three-dimensional models related to a step in a product assembly process.

At 404, the training method 400 augments at least one two-dimensional image with data from the three-dimensional model. The augmented data template at least comprises the step in the process the image represents, the edge map of at least one base component, the edge map of at least one constituent component, the spatial relationship between them, and an acceptable tolerance between the ideal position of the constituent components and where it is placed by the worker. The tolerance may be measured using a percentage of area occupied, a boundary of pixels, or any other appropriate measure.

At 406, the training method 400 stores the augmented image data in the template storage 110. For example, the training method 400 may fully populate the template storage 110 with at least one augmented image file for each step in the product assembly process. At S408, the first machine learning model 106 accesses the template storage 110 to use as references when comparing images captured by the image capture device 104.

Figure 5:
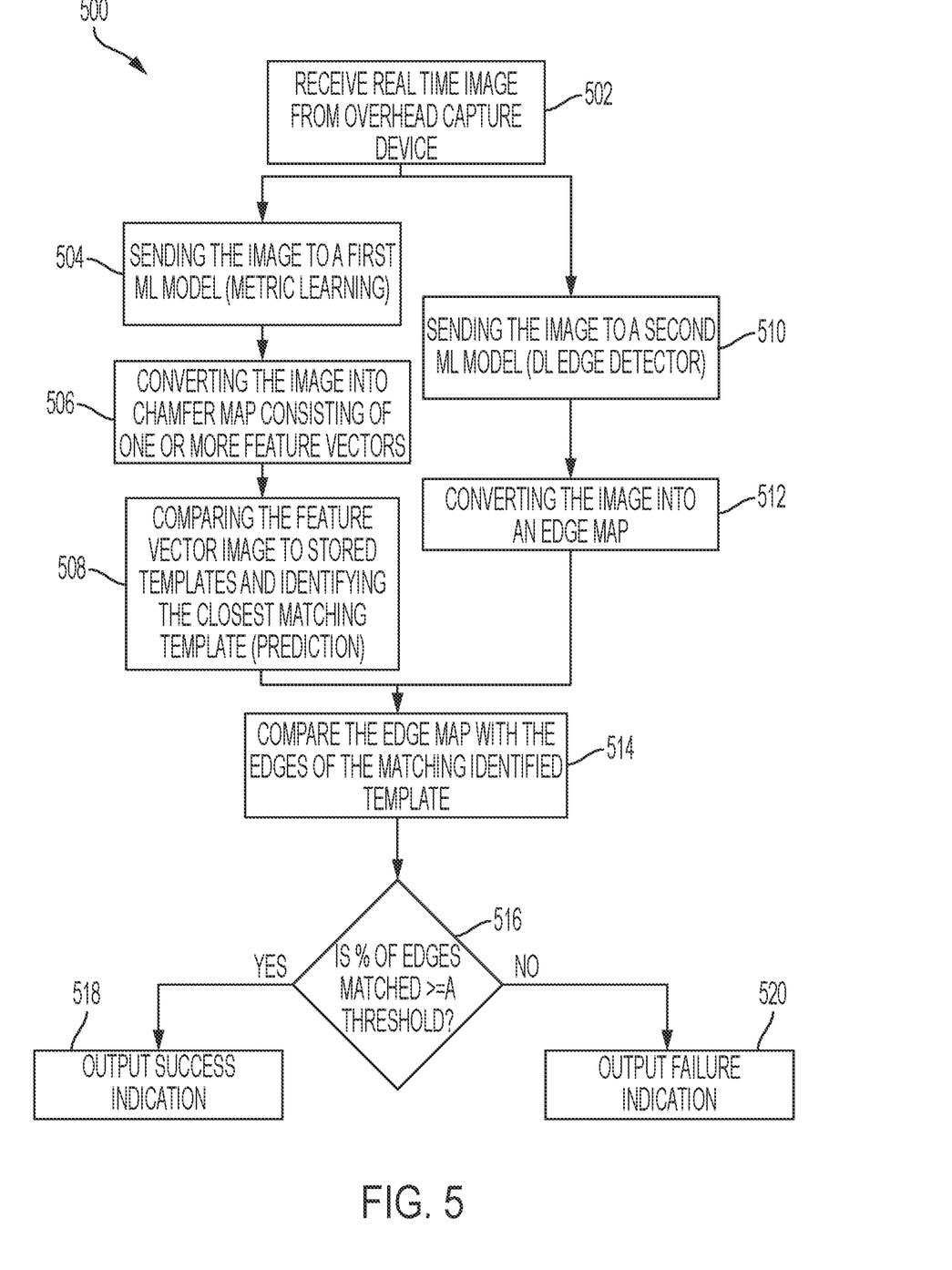
FIG. 5 is a flow chart generally illustrating an alternative machine learning model training method according to the principles of the present disclosure.

FIG. 5 provides a block diagram illustrating the method 500, a high-level overview for detecting a step in a product assembly process. At 502, the method 500 receives a real-time image from the overhead capture device 104. The image capture device 104 captures a continuous stream of real-time images; at least one of the images is sent to the first- and second-machine learning models.

At 504, the method 500 receives the captured image. At 506, the method 500 received image may be converted into an oriented edge map via holistically-nested edge detection. That is followed by edge-based non-maximum suppression and edge orientation computation. At 508, the method 500 queries the resulting edge map against all the available templates in the template storage 110. The first machine learning model extracts the oriented edges from the edge map and the template and compares the 0 value at each (X, Y) coordinate of every pixel of the detected edges. The extracted oriented edges compare with each edge of the template. The template that most closely matches the captured image is determined; the matched template is designated as the initial prediction of the systems and methods described herein.

At 510, the method 500 also sends the captured image to the second machine learning model 108, which converts the image into an edge map using deep learning (DL) edge detection. For example, one possible DL edge detector is canny edge detection. At 512, the method 500 the outputs an edge map generated by the second machine learning model which detects the edges of the captured image. At 514, the method 500 instructs the second machine learning model to use metric learning to compare the generated edge map with the initial prediction template. Each edge pixel is compared to a corresponding pixel from the captured image data. Comparisons of the 0 value at each (X, Y) coordinate generates, by the processor, a similarity value. If edge support exists at a ratio greater than a threshold (e.g., greater than or equal to 60% or other suitable percentage, value, absolute value, integer and the like) of all edges of any one template, that template indicates the prediction of the current step in the product assembly process is correct. Based on whether the initial prediction was verified, the method 500 continues to either 518 (if the prediction was successfully verified) or 520 (if the prediction was not successfully verified).

Figure 6:
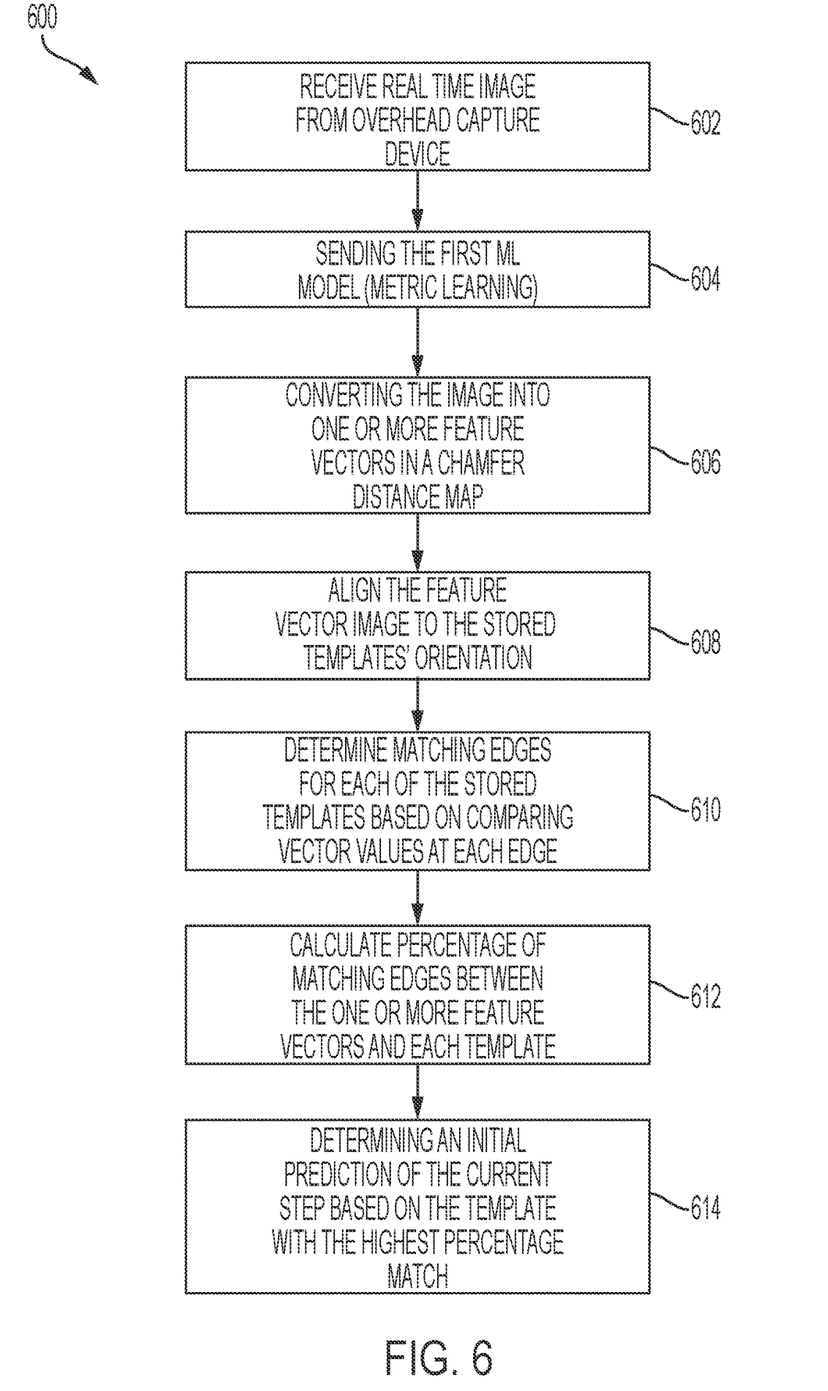
FIG. 6 is a flow chart generally illustrating an alternative machine learning model training method according to the principles of the present disclosure.

FIG. 6 is a block diagram that illustrates the method 600. At 602, method 600 receives from the image capture device 104 real-time image data. At 604, the method 600 receives the image by the first machine learning model 106. At 606, the method 600 converts the received image data into one or more feature vectors arranged in a map. At 608, the method 600 orients the converted feature vector map to the uniform orientation shared by all templates.

At 610, method 600 determines which of the templates stored in template storage 110 most closely matches the received image. The method 600 aligns the feature vector map based on the received image with each of the stored templates. The first machine learning model 106 uses metric learning to determine a similarity value between the received image and each of the templates. A similarity value is determined by overlaying the template with the feature vector map generated based on the received image. Comparing the vector values at each edge location of the received image with the corresponding location of the template.

At 612, method 600 computes a percentage of matching edges for each template based on the number of matching edges. At 614, the method 600 makes a prediction of the step by selecting the template with the highest percent match with the received image; the step related to that template is the predicted step of the product assembly process. The predicted step is designated as the initial prediction. The process of verifying the prediction is explained above in reference to steps 510-520.

Figure 7:
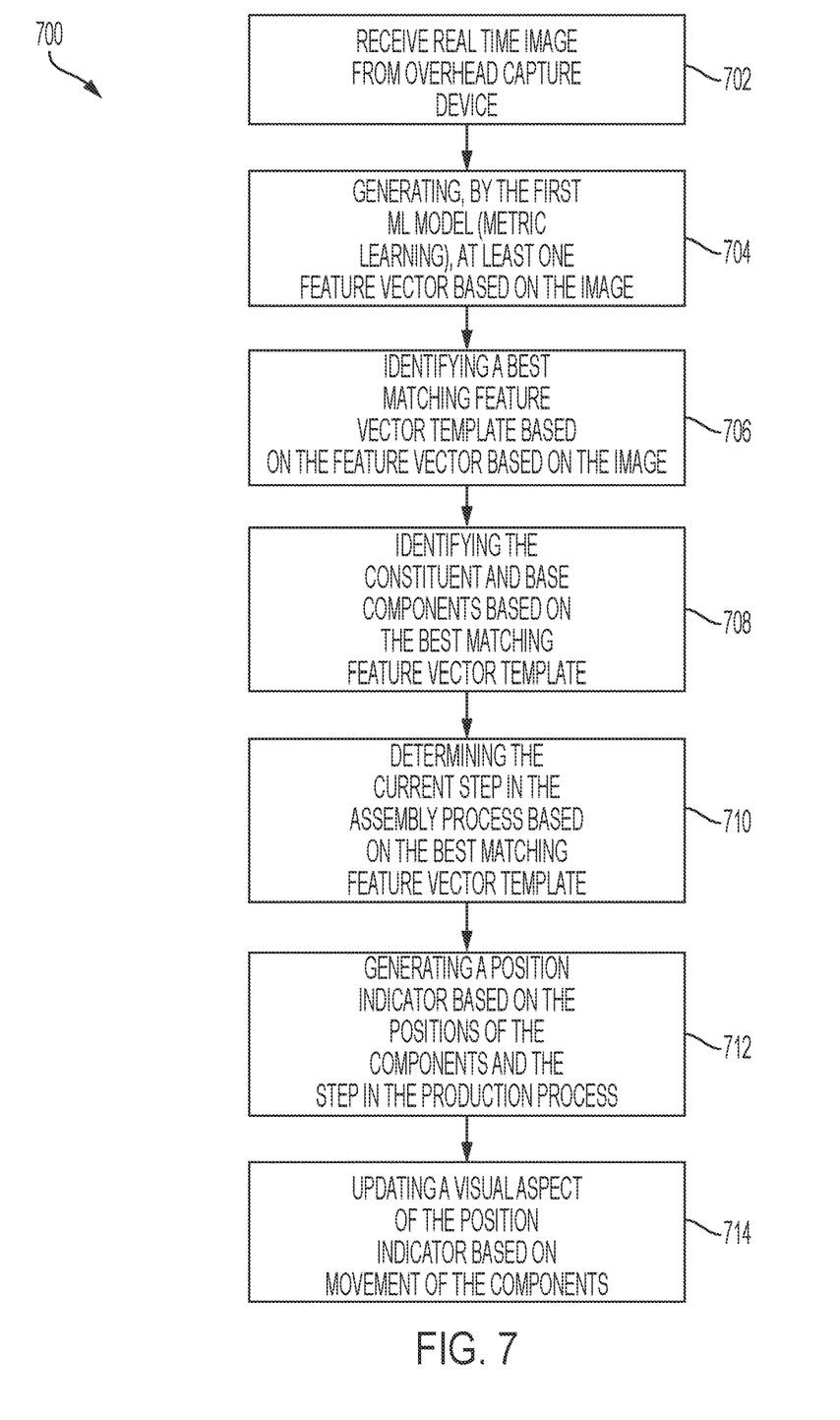
FIG. 7 is a flow chart generally illustrating an alternative step recognition method according to the principles of the present disclosure.

FIG. 7 is a block diagram that illustrates the method 700 for identifying a step in a product assembly process. At 702, the method 700 receives at least one real time image from the image capture device. At 704, the method 700 generates, by the first machine learning model, at least one feature vector based on the image. At 706, the method 700 identifies the best matching feature vector template of the plurality of feature vector templates. At 708, the method 700 identifies at least one constituent component, at least one base component, and the spatial relationship between them, based on the identified feature vector template.

At 710, the method 700 determines the current step in the assembly process based on the best matching feature vector template. At 712, the method 700 generates a position indicator based on the positions of the components and the step in the production process. At 714, the method 700 updates at least one visual aspect of the position indicator based on the movement of components captured by the image capture device.

In some embodiments, the method includes receiving, from an image capture device, image data including at least one image corresponding to a step in a product assembly process; generating, using a first machine learning model trained using an augmented dataset generated based on at least one two-dimensional image and at least one corresponding three-dimensional digital model, one or more feature vectors based on the at least one image; identifying a feature vector template of a plurality of feature vector templates based on the one or more feature vectors; identifying at least one base component and at least one constituent component based on the feature vector template; determining a current step in the product assembly process based on the identification of the at least one base component, the at least one constituent component, and the feature vector template; generating a position indicator based on the identification of the at least one base component, the at least one constituent component, and the feature vector template in the product assembly process; generating, for display, an output that includes, at least, the at least one base component, the at least one constituent component, and position indicator; and receiving subsequent image data and adjusting a visual aspect of the position indicator based on the subsequent image data.

In some embodiments, the method further includes, in response to a change in the image data, corresponding to movement of the constituent component, determining a percentage of matching edges between the image data of the constituent component and the position indicated by the feature vector template.

In some embodiments, the method further includes outputting an indication of success in response to the percentage of matching edges being greater than a threshold and outputting an indication of failure in response to the percentage of matching edges being less than the threshold.

In some embodiments, the method further includes displaying the position indicator corresponding to the position of the at least one constituent component in relation to the at least one base component, as indicated by the feature vector template.

In some embodiments, the method further includes, the display indicating success by altering a visual aspect of the position indicator.

In some embodiments, the method further includes the base component may be a door and the constituent component is configured to mate with the base component.

In some embodiments, the method further includes the feature vector template having an orientation corresponding to orientations of the plurality of feature vector templates, and wherein the identified feature vector template includes visual aspect data of the at least one image.

In some embodiments, the method further includes identifying the feature vector template of a plurality of feature vector templates based on the one or more feature vectors generating an initial prediction template; generating, by a second machine learning model, an edge map based on the image data; generating a similarity value by comparing the edge map with the initial prediction template; and determining the initial prediction template is valid in response to a determination that the similarity value is greater than or equal to a threshold.

In some embodiments, the method further includes the plurality of feature vector templates being generated by: receiving a training dataset that includes at least one two-dimensional image, at least one corresponding three-dimensional model, and an associated step in a product assembly process, the training dataset being associated with at least one base component, at least one constituent component and a spatial relationship between them; and generating one of the feature vector templates related to a step in a process by augmenting the two-dimensional image with visual and spatial relationship data from the three-dimensional model associated with the same step in the product assembly process.

In some embodiments, the system includes a processor; and a memory including instructions that, when executed by the processor, cause the processor to: receive, from an image capture device, image data including at least one image corresponding to a step in a product assembly process; generate, using a first machine learning model trained using an augmented dataset generated based on at least one two-dimensional image and at least one corresponding three-dimensional digital model, one or more feature vectors based on the at least one image; identify a feature vector template of a plurality of feature vector templates based on the one or more feature vectors; identify at least one base component and at least one constituent component based on the feature vector template; determine a current step in the product assembly process based on the identification of the at least one base component, the at least one constituent component, and the feature vector template; generate a position indicator based on the identification of the at least one base component, the at least one constituent component, and the feature vector template in the product assembly process; generate, for display, an output that includes, at least, the at least one base component, the at least one constituent component, and position indicator; and receive subsequent image data and adjusting a visual aspect of the position indicator based on the subsequent image data.

In some embodiments, the system further includes, in response to a change in the image data, corresponding to movement of the constituent component, determining a percentage of matching edges between the image data of the constituent component and the position indicated by the feature vector template.

In some embodiments, the system further includes outputting an indication of success in response to the percentage of matching edges being greater than a threshold and outputting an indication of failure in response to the percentage of matching edges being less than the threshold.

In some embodiments, the system further includes displaying the position indicator corresponding to the position of the at least one constituent component in relation to the at least one base component, as indicated by the feature vector template.

In some embodiments, the system further includes, the display indicating success by altering a visual aspect of the position indicator.

In some embodiments, the system further includes the base component may be a door and the constituent component is configured to mate with the base component.

In some embodiments, the system further includes the feature vector template having an orientation corresponding to orientations of the plurality of feature vector templates, and wherein the identified feature vector template includes visual aspect data of the at least one image.

In some embodiments, the system further includes identifying the feature vector template of a plurality of feature vector templates based on the one or more feature vectors generating an initial prediction template; generating, by a second machine learning model, an edge map based on the image data; generating a similarity value by comparing the edge map with the initial prediction template; and determining the initial prediction template is valid in response to a determination that the similarity value is greater than or equal to a threshold.

In some embodiments, the system further includes the plurality of feature vector templates being generated by: receiving a training dataset that includes at least one two-dimensional image, at least one corresponding three-dimensional model, and an associated step in a product assembly process, the training dataset being associated with at least one base component, at least one constituent component and a spatial relationship between them; and generating one of the feature vector templates related to a step in a process by augmenting the two-dimensional image with visual and spatial relationship data from the three-dimensional model associated with the same step in the product assembly process.

In some embodiments, the apparatus includes a processor; and a memory including instructions that, when executed by the processor, cause the processor to: receive, from an image capture device, image data including at least one image corresponding to a step in a product assembly process; generate, using a first machine learning model trained using an augmented dataset generated based on at least one two-dimensional image and at least one corresponding three-dimensional digital model, one or more feature vectors based on the at least one image; identify a feature vector template of a plurality of feature vector templates based on the one or more feature vectors; identify at least one base component and at least one constituent component based on the feature vector template; determine a current step in the product assembly process based on the identification of the at least one base component, the at least one constituent component, and the feature vector template; generate a position indicator based on the identification of the at least one base component, the at least one constituent component, and the feature vector template in the product assembly process; generate, for display, an output that includes, at least, the at least one base component, the at least one constituent component, and position indicator; and receive subsequent image data and adjusting a visual aspect of the position indicator based on the subsequent image data.

In some embodiments, the apparatus further includes, in response to a change in the image data, corresponding to movement of the constituent component, determining a percentage of matching edges between the image data of the constituent component and the position indicated by the feature vector template.

The foregoing description, for purposes of explanation, uses specific nomenclature to provide a thorough understanding of the described embodiments. However, it should be apparent to one skilled in the art that the specific details are not required to practice the described embodiments. Thus, the foregoing descriptions of specific embodiments are presented for purposes of illustration and description. They are not intended to be exhaustive or to limit the described embodiments to the precise forms disclosed. It should be apparent to one of ordinary skill in the art that many modifications and variations are possible in view of the above teachings.

The above discussion is meant to be illustrative of the principles and various embodiments of the present disclosure. Once the above disclosure is fully appreciated, numerous variations and modifications may become apparent to those skilled in the art. It is intended that the following claims be interpreted to embrace all such variations and modifications.

What is claimed is:

1. A method for product assembly step recognition, the method comprising:
receiving, from an image capture device, image data including at least one image corresponding to a step in a product assembly process;
generating, using a first machine learning model trained using an augmented dataset generated based on at least one two-dimensional image and at least one corresponding three-dimensional digital model, one or more feature vectors based on the at least one image;
identifying a feature vector template of a plurality of feature vector templates based on the one or more feature vectors;
identifying at least one base component and at least one constituent component based on the feature vector template;
determining a current step in the product assembly process based on the identification of the at least one base component, the at least one constituent component, and the feature vector template;
generating a position indicator based on the identification of the at least one base component, the at least one constituent component, and the feature vector template in the product assembly process;
generating, for display, an output that includes, at least, the at least one base component, the at least one constituent component, and position indicator; and
receiving subsequent image data and adjusting a visual aspect of the position indicator based on the subsequent image data.

2. The method of claim 1, further comprising, in response to a change in the image data, corresponding to movement of the constituent component, determining a percentage of matching edges between the image data of the constituent component and the position indicated by the feature vector template.

3. The method of claim 2, further comprising outputting an indication of success in response to the percentage of matching edges being greater than a threshold and outputting an indication of failure in response to the percentage of matching edges being less than the threshold.

4. The method of claim 1, further comprising displaying the position indicator corresponding to the position of the at least one constituent component in relation to the at least one base component, as indicated by the feature vector template.

5. The method of claim 1, wherein the display indicates success by altering a visual aspect of the position indicator.

6. The method of claim 1, wherein the base component includes a door and the constituent component is configured to mate with the base component.

7. The method of claim 1, wherein the feature vector template has an orientation corresponding to orientations of the plurality of feature vector templates, and wherein the identified feature vector template includes visual aspect data of the at least one image.

8. The method of claim 1, wherein identifying the feature vector template of a plurality of feature vector templates based on the one or more feature vectors generates an initial prediction template; generating, by a second machine learning model, an edge map based on the image data; generating a similarity value by comparing the edge map with the initial prediction template; and determining the initial prediction template is valid in response to a determination that the similarity value is greater than or equal to a threshold.

9. The method of claim 1, wherein the plurality of feature vector templates are generated by: receiving a training dataset that includes at least one two-dimensional image, at least one corresponding three-dimensional model, and an associated step in a product assembly process, the training dataset being associated with at least one base component, at least one constituent component and a spatial relationship between them; and generating one of the feature vector templates related to a step in a process by augmenting the two-dimensional image with visual and spatial relationship data from the three-dimensional model associated with the same step in the product assembly process.

10. A system for product assembly step recognition, the system comprising:
a processor; and
a memory including instructions that, when executed by the processor, cause the processor to:
receive, from an image capture device, image data including at least one image corresponding to a step in a product assembly process;
generate, using a first machine learning model trained using an augmented dataset generated based on at least one two-dimensional image and at least one corresponding three-dimensional digital model, one or more feature vectors based on the at least one image;
identify a feature vector template of a plurality of feature vector templates based on the one or more feature vectors;
identify at least one base component and at least one constituent component based on the feature vector template;
determine a current step in the product assembly process based on the identification of the at least one base component, the at least one constituent component, and the feature vector template;
generate a position indicator based on the identification of the at least one base component, the at least one constituent component, and the feature vector template in the product assembly process;
generate, for display, an output that includes, at least, the at least one base component, the at least one constituent component, and position indicator; and
receive subsequent image data and adjusting a visual aspect of the position indicator based on the subsequent image data.

11. The system of claim 10, further comprising, in response to a change in the image data, corresponding to movement of the constituent component, determining a percentage of matching edges between the image data of the constituent component and the position indicated by the feature vector template.

12. The system of claim 11, further comprising outputting an indication of success in response to the percentage of matching edges being greater than a threshold and outputting an indication of failure in response to the percentage of matching edges being less than the threshold.

13. The system of claim 10, further comprising displaying the position indicator corresponding to the position of the at least one constituent component in relation to the at least one base component, as indicated by the feature vector template.

14. The system of claim 10, wherein the display indicates success by altering a visual aspect of the position indicator.

15. The system of claim 10, wherein the base component includes a door and the constituent component is configured to mate with the base component.

16. The system of claim 10, wherein the feature vector template has an orientation corresponding to orientations of the plurality of feature vector templates, and wherein the identified feature vector template includes visual aspect data of the at least one image.

17. The system of claim 10, wherein identifying the feature vector template of a plurality of feature vector templates based on the one or more feature vectors generates an initial prediction template; generating, by a second machine learning model, an edge map based on the image data; generating a similarity value by comparing the edge map with the initial prediction template; and determining the initial prediction template is valid in response to a determination that the similarity value is greater than or equal to a threshold.

18. The system of claim 10, wherein the plurality of feature vector templates are generated by: receiving a training dataset that includes at least one two-dimensional image, at least one corresponding three-dimensional model, and an associated step in a product assembly process, the training dataset being associated with at least one base component, at least one constituent component and a spatial relationship between them; and generating one of the feature vector templates related to a step in a process by augmenting the two-dimensional image with visual and spatial relationship data from the three-dimensional model associated with the same step in the product assembly process.

19. An apparatus for product assembly step recognition, the apparatus comprising:

a processor; and
a memory including instructions that, when executed by the processor, cause the processor to:
receive image data including at least one image corresponding to at least one base component of a product assembly;
generate, using a first machine learning model trained using an augmented dataset generated based on at least one two-dimensional image and at least one corresponding three-dimensional digital model, one or more feature vectors based on the at least one image;
identify a feature vector template of a plurality of feature vector templates based on the one or more feature vectors;
generate an initial prediction based on the identified feature vector template;
generate, using a second machine learning model, at least one edge map based on the at least one image;
generate a similarity score by comparing the edge map with the identified feature vector template; and
in response to determining that the similarity value is greater than or equal to a threshold, determining that initial prediction is valid.

20. The apparatus of claim 19, further comprising displaying the received image data, from the image capture device, overlaid with a position indicator for a constituent component, based on the template.

* * * * *